Patented Aug. 30, 1927

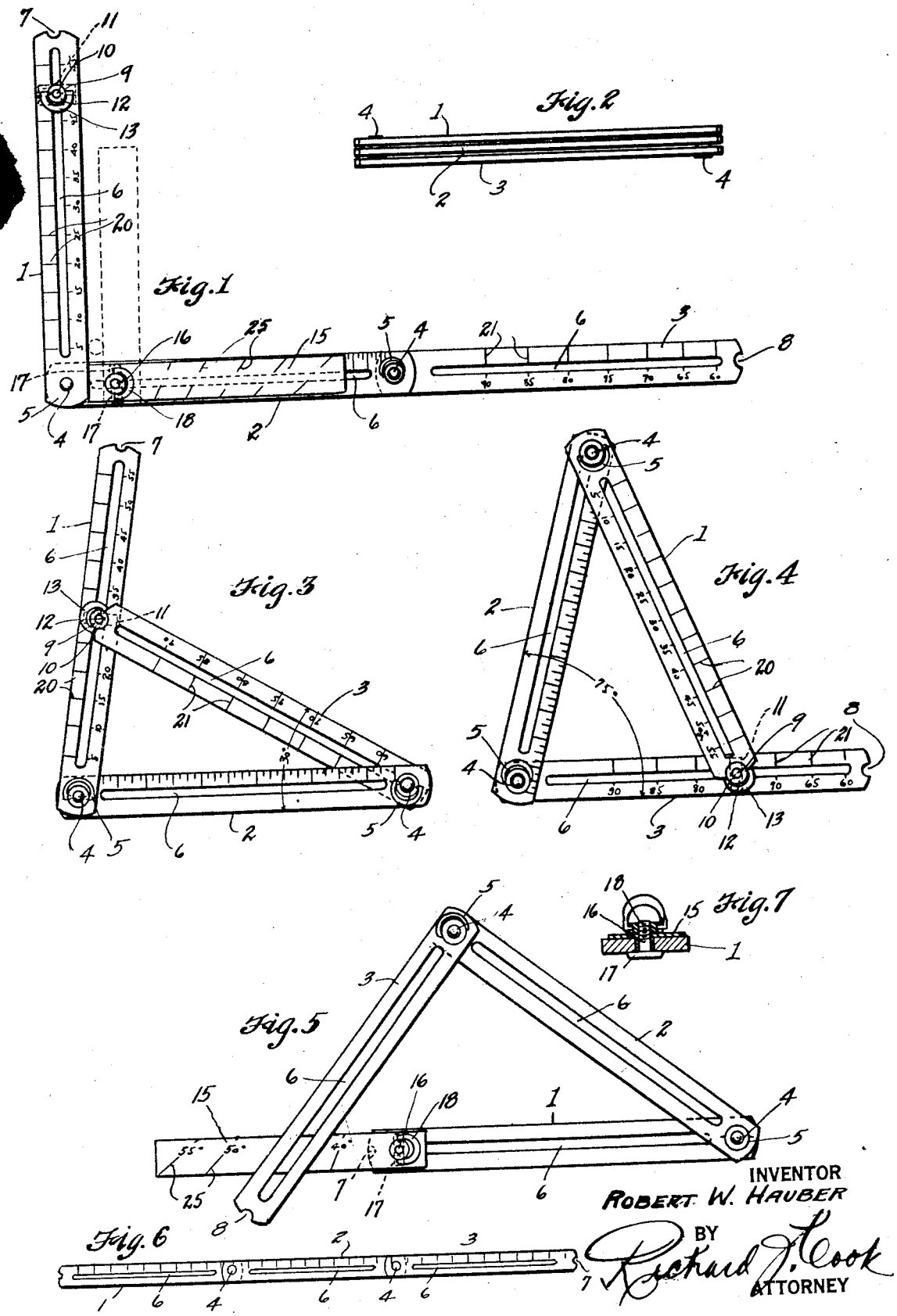

1,640,604

UNITED STATES PATENT OFFICE.

ROBERT W. HAUBER, OF BREMERTON, WASHINGTON.

COMBINATION SQUARE.

Application filed September 17, 1923. Serial No. 663,299.

This invention relates to a combination square and rule, of a type that is particularly adapted for use by machinists and carpenters, and has for its principal object to provide a device of the folding rule type that may be used as a square, tri-square for measuring or laying out angles and bevels, for measuring lengths, thicknesses, or diameters of objects and for various other uses.

Other objects of the invention reside in the various details of construction and combination of parts, and in the manner of using the device.

In accomplishing these and other objects of the invention, I have provided the improved details of construction, the preferred forms of which are illustrated in the accompanying drawings, wherein—

Figure 1 is a view of the device with the parts thereof positioned for use as a square.

Figure 2 is a side view of the device with the sections folded together in collapsed relation.

Figures 3 and 4 illustrate the use of the device as a tri-square and for laying out angles.

Figure 5 illustrates the arrangement of parts for laying out or measuring bevels.

Figure 6 shows the parts extended for use as a rule for measuring lengths.

Figure 7 is a sectional view taken on the line 7—7 in Figure 5.

Referring more in detail to the several views of the drawing—

The device, in its preferred construction, comprises three sections 1, 2 and 3 having ends pivotally joined by set screws 4 preferably with folding heads 5 whereby the screws may be turned to loosen or tighten the sections together so that they may be held in adjusted positions, and also so that they may be folded one upon the other, as shown in Figure 2, when it is desired to collapse the device.

Each section is provided centrally with a longitudinally extending slot 6 and the free ends of sections 1 and 3 are provided respectively with semi-circular notches 7 and 8 for a purpose presently described. A locking or clamping device 9 is provided for use interchangeably in any of the slots 6 and this comprises a screw shank 10 with a rectangular head 11 at one end that may, by turning it lengthwise, be inserted or removed from the slot, and provided at its other end with a nut 12 with a hinged turning member 13 whereby it may be tightened or loosened. There is also provided an extension plate 15 provided at one end with a set screw 16 having a rectangular head 17 at one end which may be inserted through the slots of any piece and held therein by turning the head transversely of the slot, and provided at its other end with a nut 18 that may be tightened on the screw and whereby the extension may be held secure. The ends of the extension member are cut at right angles to the side edges of the piece and serve as a means for setting the sections properly for use as a square.

To use the device as the ordinary carpenter's square, sections 2 and 3 are moved to co-extensive relation and section 1 is turned at right angles to section 2; it being adjusted accurately to this position by moving the end of the extension plate 15 against it, while the said plate is assembled with the section 2, as is shown in Figure 1. The section 1 may be held thus at a right angle to section 2 by clamping the piece 15 against it or by tightening the nut on the set screw 4 that joins these sections. All the sections are graduated in inches on the sides opposite those shown in Figure 1 and as is shown in Figure 6, and this adapts the device for use then as a square for laying out bevels, etc.

For laying out angles of various degrees the parts are used as is illustrated in Figures 3 and 4. For instance, to lay out any angle between five degrees to fifty-five degrees, the clamping device 9 is adjusted along slot 6 in section 1 to the desired degree mark; this piece being graduated by marks as at 20, for this purpose. The end notch 8 of the section 3 is then seated against the screw shank 10 and held there by clamping the nut 12 against it. Figure 3 shows the parts set so that the sections 2 and 3 form an angle of thirty degrees. To lay out angles of from sixty to eighty-five degrees, the clamp 9 is removed from piece 1 and placed in the slot 6 of section 3 and is adjusted to the desired degree mark thereon. This piece has marks, as at 21, which designate the different degrees. Figure 4 illustrates the manner of setting the parts to lay out an angle of seventy-five degrees; the angle being formed by the sections 2 and 3.

For laying out bevel cuts of various degrees, the extension plate 15 is clamped to the end of piece 1 so that it is co-extensive therewith. The section 3 is then clamped so that it extends at a right angle to section 2. The piece 15 has lines, as at 25, thereon designating different degrees of slope or pitch that the piece 3 will form with respect to the piece 1 when the edge of the piece 3 is brought into registration with these lines. If it is desired to measure the slope of a roof, the device is placed as in Figure 5, with the section 1 horizontal, and piece 2 is adjusted above its pivotal connection with piece 1 until section 3 is parallel with the surface of the roof. Then by referring to the slope marks on piece 15, the slope of the roof is determined.

In Figure 6 I have shown the parts extended to form a rule for measuring lengths of objects. The parts being clamped in alinement by tightening their set screws 4. All pieces are graduated in inches on the sides opposite those shown in Figures 1 to 5, inclusive.

It is also apparent that the device may be used for measuring diameters of bolts, etc., by placing the object to be measured against the inside of section 1, while the parts are as shown in Figure 1, and then turning piece 15 perpendicular to section 2 and sliding it along this piece until it engages with the other side of the object. Piece 2 is graduated, as shown at 26, so that diameters may be read in this way.

It is also apparent that this device may be used in other ways and for various other purposes than herein described, and for this reason I do not desire to be limited only to this.

Having thus described my invention, what I claim as new therein and desire to secure by Letters Patent, is:

A device of the character described comprising three rule sections having ends pivotally connected whereby the sections may be folded one upon the other or moved to different positions of adjustment between such folded relation and co-extensive relation; each of said sections being provided with a longitudinally extending slot and the outer ends of the outer sections being provided with notches, a clamping device applicable to the slots of said sections and adjustable therealong and adapted to receive the notched ends of the outer sections thereagainst; said clamping device comprising a tightening nut whereby the end of said sections may be held.

Signed at Seattle, King County, Washington, this 16th day of August 1923.

ROBERT W. HAUBER.